US006061458A

United States Patent [19]

East et al.

[11] Patent Number: 6,061,458

[45] **Date of Patent: *May 9, 2000**

[54] AUDIO MIXING CONSOLE

[75] Inventors: John William East, Witney; Simon Irving Harrison, Stanton Harcourt; Paul Anthony Frindle, Witney; William Edmund Cranstoun Kentish, Chipping Norton, all of United Kingdom

[73] Assignees: Sony Corporation, Tokyo, Japan; Sony United Kingdom Limited, Weybridge, United Kingdom

[ * ] Notice: This patent is subject to a terminal disclaimer.

[21] Appl. No.: 08/649,055

[22] Filed: May 16, 1996

[30] Foreign Application Priority Data

May 19, 1995 [GB] United Kingdom .................. 9510206

[51] Int. Cl.[7] .................................................. H04B 1/00

[52] U.S. Cl. ........................................................ 381/119

[58] Field of Search .................................... 381/119, 109, 381/104, 106, 80, 81, 85, 123, 77

[56] References Cited

U.S. PATENT DOCUMENTS

| | | | |
|---|---|---|---|
| 3,962,620 | 6/1976 | Dion | 318/599 |
| 4,879,751 | 11/1989 | Franks et al. | 381/119 |
| 4,885,792 | 12/1989 | Christensen et al. . | |
| 5,054,077 | 10/1991 | Suzuki . | |
| 5,175,771 | 12/1992 | Zampini et al. | 381/119 |
| 5,233,666 | 8/1993 | Deveau | 381/109 |
| 5,317,641 | 5/1994 | Yasuda et al. . | |

FOREIGN PATENT DOCUMENTS

| | | |
|---|---|---|
| 0 251 646 A3 | 1/1988 | European Pat. Off. . |
| 0251646 A2 | 1/1988 | European Pat. Off. . |
| 2140248 | 11/1984 | United Kingdom . |
| 2250834 | 6/1992 | United Kingdom . |
| 2 255 696 | 11/1992 | United Kingdom . |
| 2265286 | 9/1993 | United Kingdom . |
| WO 91 18456 | 11/1991 | WIPO . |
| WO9303549 | 2/1993 | WIPO . |

*Primary Examiner*—Vivian Chang

*Attorney, Agent, or Firm*—Frommer Lawrence & Haug, LLP.; William S. Frommer

[57] ABSTRACT

An audio mixing console provides for a selected group of channels to be assigned to a bank of channel controls for a channel function (e.g., a solo mode) with a global function indicator for indicating that the predetermined channel function has been selected for at least one channel. A global function cancel button for canceling the channel function in all channels is provided. Various solo modes can be selected. A logic button includes a button member moveable between a raised position and a depressed position, a switch contact open in the raised position and closed in the depressed position and a logical latch (e.g., software-implemented) responsive to a first closing of the switch on a first depression of the button to change from an inactive state to an active state and to a second opening of the switch on a second release of the button to change from the active state to the inactive state. An automation mode controller is operable, in a first pass, to store on-going switch timing at which the user operable control is switched from off to on and off-going switch timings at which the switch is switched from on to off for automatically reproducing the control switchings in a subsequent pass.

16 Claims, 6 Drawing Sheets

AUDIO MIXING CONSOLE

BACKGROUND OF THE INVENTION

1. Field of the Invention

This invention relates to an audio mixing console for processing a plurality of audio channels, in each of which a plurality of audio functions are to be performed.

2. Description of the Prior Art

Traditionally, audio mixing consoles have been based on discrete technology with audio signal processing modules connected together in a desired relationship and then controlled by manually operable switches on the console. However, traditional audio mixing consoles have a number of disadvantages including their physical size, the total number of manually operable controls (fader, potentiometers, switches, etc.), and the relative inflexibility of the overall arrangement. Typically, audio mixing consoles provide of the order of 128 channels, in each of which gain, equalisation and other audio processing functions can be performed, with a dedicated channel fader provided for each channel. In addition each channel may require about 100 parameter adjustments (e.g. gain, equalisation filter frequencies, etc.,) and buttons for controlling particular operating modes such as a solo mode to enable the monitoring of a single channel. This means that a full console will include a very large number of faders, buttons, control knobs, etc.

Accordingly, it has been proposed to provide an audio mixing console comprising a front panel including a plurality of user operable controls for controlling different audio signal processing functions and a digital signal processor for processing audio signals in response to the settings of the user operable controls. It has been proposed to reduce the number of faders by providing a mixing console with a bank of faders which can be allocated to a selected group of channels. It is hoped that such technology can lead to reductions in the overall size of such consoles while at the same time increasing flexibility. However, a disadvantage of such technology is the removal of the direct physical relationship between the actual audio functions and interconnections and user controls of the mixing console and the processing of those functions. For example, a problem arises with the display of the status of control functions which are associated with a channel which is not currently allocated to the bank of faders.

SUMMARY OF THE INVENTION

In accordance with a first aspect of the present invention, therefore, there is provided an audio mixing console for processing a plurality of audio channels in each of which a plurality of audio processing functions are to be performed, the audio mixing console comprising a control panel including a bank of user operable channel controls, each for operating a predetermined channel function for a respective channel, means for assigning selected group of channels to the bank of channel controls, and a global function indicator for indicating that the predetermined channel function has been activated for at least one channel.

By the provision of a global function indicator it is possible for the global function indicator to indicate that the predetermined channel function has been activated for at least one channel and the channel is in a group of channels currently assigned to the bank of channel controls.

Preferably, the console comprises a user operable global function cancel control, whereby user operation of the global function cancel control causes the predetermined channel function to be cancelled in all channels. By the provision of the global function cancel it is possible to cancel the predetermined channel function in all channels, both for channels currently assigned and for channels not currently assigned to the bank of channel controls, whereby it is not necessary to find non-assigned channels for which the function is active in order to cancel it.

The channel controls can be buttons, possibly associated with a channel function indicator (e.g., illumination in the button) for indicating that the predetermined function is selected for the channel currently associated with that button.

Preferably the global function indicator is associated with a global function cancel button for cancelling the predetermined channel function in all channels.

In a preferred embodiment of the invention each channel control of the bank of user operable channel controls is associated with a respective channel fader, the assigning means assigning a selected group of channels to the bank of channel controls and associated channel faders.

Also, in a preferred embodiment of the invention, the predetermined function is a solo channel monitoring function.

Preferably, activation of a solo channel monitoring control causes the muting of all other channels except those having an activated solo channel monitoring control. This permits the operator to listen individually to the component sounds (typically separate instruments) of the complete mix.

Preferably, the global function indicator and global function cancel button may also be applied to pre-fade listen and after-fade listen functions.

In another aspect of the invention, therefore, there is provided an audio mixing console for processing a plurality of audio channels in each of which a plurality of audio processing functions are to be performed, the audio mixing console comprising a control panel including a bank of solo function selectors, each for a respective channel, which may be assignable, and a solo function selector for selecting one of a plurality of solo channel monitoring functions, the solo modes selectable by the solo function selector comprising one or more of the following solo modes, namely:

a mode in which each of one or more channels may be selected for solo monitoring by a first operation of a respective user operable control, with selection remaining until cancelled either by a second operation of the appropriate user operable control or by operation of a global cancel by a global function cancel control;

a mode in which a channel may be selected for solo monitoring by a first operation of a corresponding user operable control, with selection remaining until cancelled either by a second operation of the corresponding user operable control or by operation of a global cancel by a global function cancel control or by a first operation of a user operable control for another channel; and a mode in which a channel is selected for solo monitoring only during a period of a operation of a user operable control for the channel, the selection being cancelled on termination of user operation of the user operable control.

Preferably, also, the or each indicator is illuminated to indicate active selection.

The invention also provides, possibly in a console as defined above, a logic button, the logic button comprising a button member which is moveable between a raised position and a depressed position, a switch contact which is open in the raised button member position and is closed in the depressed button member position and logical latch means which is responsive to a first closing of the switch on a first depression of the button to change from an inactive logical state to an active logical state, maintains the active state on a first opening of the switch on a first release followed by a second closing of the switch on second depression of the button member, and is responsive to a second opening of the switch on a second release of the button member to change from the active logical state to the inactive logical state. By means of a logic switch such as described above, it is possible to emulate a mechanical latch type switch.

The logic button preferably includes an indicator which is illuminated in the active logical state of the logic button and is not illuminated in the inactive logical state.

The invention also provides a user operable control, possibly in a console as defined above, having an on state and an off state and an automation mode controller operable, in a first pass, to store on-going switch timings at which the user operable control is switched from off to on and off-going switch timings at which the user operable control is switched from on to off for automatically reproducing the control switchings in a subsequent pass, the automation mode controller being operable in a subsequent pass selectively to change the on-going and/or off-going switch changes by overlapping switch timings.

Preferably, the automation mode controller is responsive:

to switching on of the switch before the recorded on-going switch timing followed by switching off of the switch after the recorded on-going switch timing but before the recorded off-going switch timing for advancing a recorded on-going switch timing by overwriting the recorded on-going switch timing with a timing of the switching on; or to switching on of the switch after the recorded on-going switch timing but before the recorded off-going switch timing followed by switching off of the switch after the recorded off-going switch timing for delaying a recorded off-going switch timing by overwriting the recorded off-going switch timing with a timing of the switching off; or to switching on of the switch before the recorded on-going switch timing followed by switching off of the switch after the recorded off-going switch timing for deleting the recorded on-going and off-going switch timings.

In accordance with another aspect of the invention, a user operable control is provided to select the signal source for the control room loudspeakers. In a conventional console, if an after-fade listen (AFL) or pre-fade listen (PFL) function is activated, the result will be heard on the control room loudspeakers. Operation of the loudspeaker source selector function connects the loudspeakers permanently to the main stereo output bus only, allowing the operator to monitor AFL and PFL functions privately using headphones, while the complete mix is audible on the loudspeakers.

The invention also provides, in a further aspect, an audio mixing console for processing a plurality of audio channels in each of which a plurality of audio processing functions are to be performed, a multichannel recording means, a first gain control (e.g., a recording level control) and a second serially connected gain control (e.g., a monitor level control), wherein the second gain control is functionally responsive to the first gain control.

Preferably the second gain control is responsive to adjustments of the first gain control to apply inverse adjustments to the gain for the second gain control, whereby a constant output can be provided to the user of a monitor function even during changes in the recording gain in order to optimise the signal to noise ratio on recording by adjusting the recording level control.

BRIEF DESCRIPTION OF THE DRAWINGS

An embodiment of the invention will be described by way of example only with reference to the accompanying drawings in which.

DESCRIPTION OF THE PREFERRED EMBODIMENTS

Figure 1:
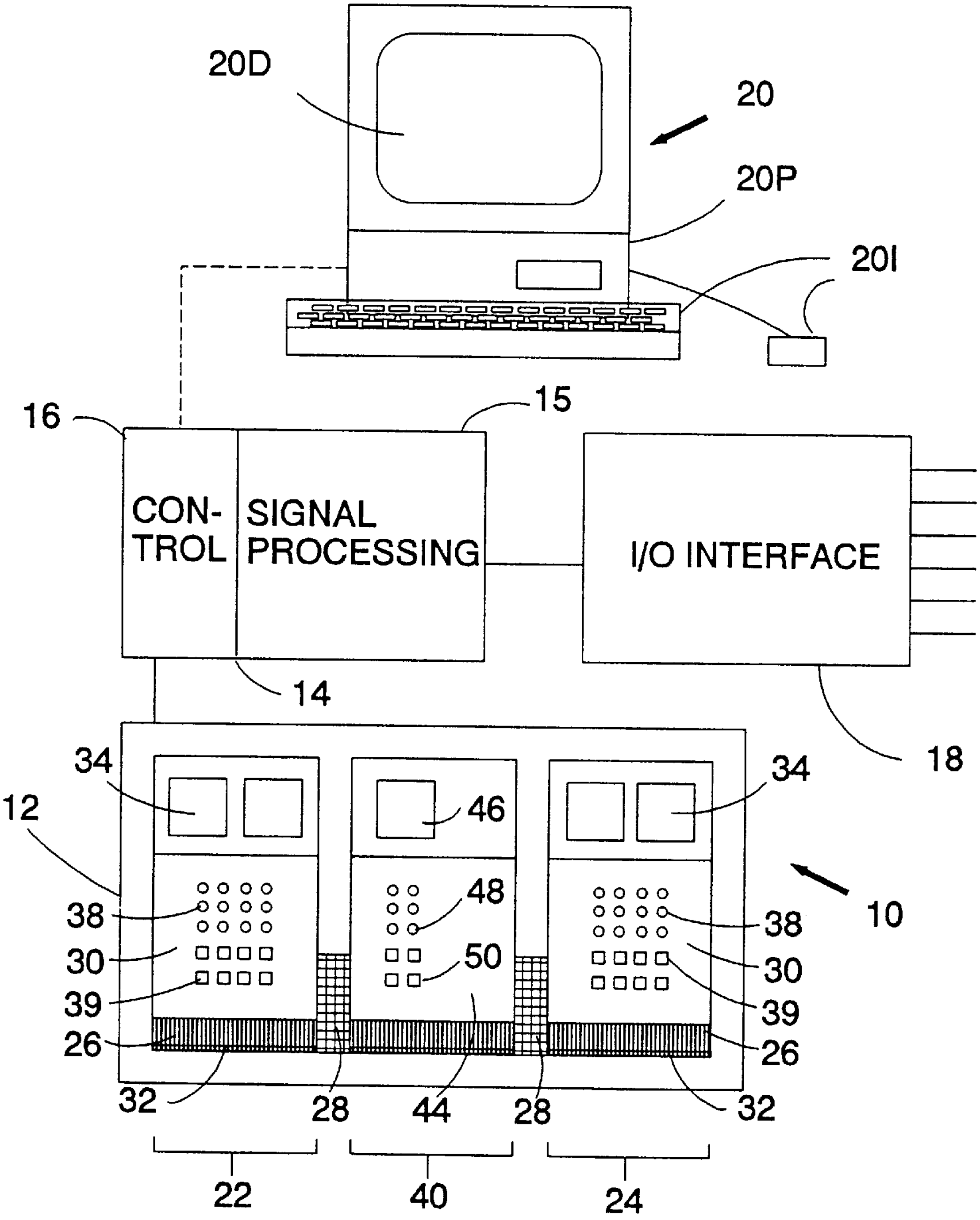
FIG. 1 is a schematic block diagram of a mixing console for audio signal processing.

FIG. 1 represents a simplified block diagram of a mixing console 10 for use in an audio recording studio. The console 10 comprises a front panel 12, a processor network 14 comprising an array of signal processors 15 and a plurality of control processors and buffer circuitry 16, and one or more input/output interface processors and interfaces 18. Also shown in FIG. 1 is a host unit 20, which could be permanently connected to the remainder of the system, or could be connected only during initialisation and debugging stages of operation.

The panel 12 comprises an array of operator controls including faders, switches, rotary controllers, video display units, lights and other indicators, as represented in a schematic manner in FIG. 1. Optionally the panel 12 can also be provided with a keyboard, tracking device(s), etc, and general purpose processor (not shown) for the input of the control of aspects of the operation of the console. One or more of the video display units on the panel can then be used as the display for the general purpose computer.

In one embodiment, the host unit 20 is implemented as a general purpose workstation incorporating a computer aided design (CAD) package and other software packages for interfacing with the other features of the mixing console. The host unit could alternatively be implemented as a purpose built workstation including special purpose processing circuitry in order to provide the desired functionality, or as a mainframe computer, or part of a computer network. As shown in FIG. 1, the control unit 20 includes a display 20D, user interface devices 20I such as a keyboard, mouse, etc., and a processing and communication unit 20P.

In normal operation, control of the mixing console is performed at the front panel, or mixing desk 12. The mixing console 10 is connected to other devices for the communication of audio and control data between the processor network 14 and various input/output devices (not shown) such as, for example, speakers, microphones, recording devices, musical instruments, etc. Operation of the studio network can be controlled at the front panel or mixing desk 12 whereby communication of data between the devices in the studio network and the implementation of the necessary processing functions is performed by the processor network 14 in response to operation of the panel controls.

The processor network 14 can be considered to be divided into a control side 16, which is responsive to the status of the various controls on the front panel 12, and an audio signal processing side 15 which implements the required audio processing functions in dependence upon the control settings and communicates audio data with the studio network via the I/O interface 18.

The processing of digital audio data is performed by a parallel signal processing array 15 comprising a large number of signal processing integrated circuits (SPICs). The SPICs operate under microprogram control, microcode being loaded by the host unit 20 in an initialisation phase of operation. In the preferred embodiment the processor network 14 is arranged on a rack to which is attached a plurality of cards. Each card carries an array of, for example, 25 SPICs, the horizontal and vertical buses being connected between the cards so that from a logical and electrical point of view the SPICs form one 'large' array. The buses may be connected in a loop with periodic pipeline registers to allow by-directional communication around the loop and to extend the connectivity of the array. The signal processors are also connected to the I/O interface 18.

The parallel processing array as a whole provides for the implementation of all the audio processing functions that are required depending on the configuration of the studio network and the control settings at the front panel 12 by defining digital audio processing channels on the signal processing network. The microcode loaded during the initialisation phase provides for individual audio signal processing functions, although the routing of data and the supply of coefficient data is under the control of the control processor(s) 16 at run time. To switch in or out a particular function, or to alter the routing of data, the control processor(s) 16 interface with the array of SPICs 15 to write signal data, coefficients and addresses to the SPICS and to read signal data, coefficients and addresses from the SPICS.

The control processor(s) 16 are responsive to operation of the user operable panel controls such as channel faders 26, switches 39 and control knobs 38, etc., by an operator to vary the characteristics such as signal levels, etc., of audio signals.

As can be seen in FIG. 1, the control panel of the mixing console is divided into two main sub-panels 22 and 24 with a central control panel 40. The sub-panels 22 and 24 are preferably configured in the same manner so that the user may use either the left hand or right hand sub-panel without having to adapt his or her mode of operation. The central control panel 40 contains centralised functions which are applicable to the overall operation of the control panel and to the operation of the individual sub-panels 22 and 24.

Each sub-panel 22 and 24 is arranged with a bank 26B of channel faders 26 adjacent to the user. These channel faders 26 provide the main channel faders for adjusting the gain of selected channels. Above each bank 26B of faders 26 is a control area 30 containing a plurality of user input devices such as rotary control knobs 38 and control buttons 39. The control knobs 38 are used for adjusting control parameters and the control buttons 39 are typically used for switching in and out control functions. The various user operable controls can be arranged on the control area 30 in a manner appropriate for the typical audio signal processing functions to be performed. By arranging the controls on the control area in a logical manner user operation of those controls is facilitated.

The central control area 40 also includes a set of faders for controlling main console operations including a master fader for controlling the overall gain of the audio console. It also includes a control field 44 including control knobs 48 and control buttons 50 for adjusting overall control functions and for assigning and switching in and out selected functions.

Between each of the sub-panels 22 and 24 and the central control area 40, a block of push-buttons 28 is provided for selecting a group of available channels (e.g. 256 channels in the preferred embodiment) to be assigned to the channel faders 26 (e.g., the 16, 24 or 32 channel faders) of the adjoining sub-panel 22 or 24.

Directly below each fader of the bank 26B of channel faders 26 is an access control button of a bank 32B of access control buttons 32 for assigning the associated control area 30 to a particular channel to which the particular button in the button bank 32B and the corresponding fader in the fader bank 26B is assigned. The access control buttons 32 are provided with illumination to indicate that a particular access control button 32 has been activated and the channel been accessed.

Each of the sub-panels 22 and 24 and the control panel 40 includes visual displays 34, 46 for representing desired information. Also, visual indicators are associated with the buttons 32 and 39 (e.g., lights in the buttons) to indicate when they are activated and visual displays are associated with the control knobs 36 to indicate the current "position" of those control knobs.

Figure 2:
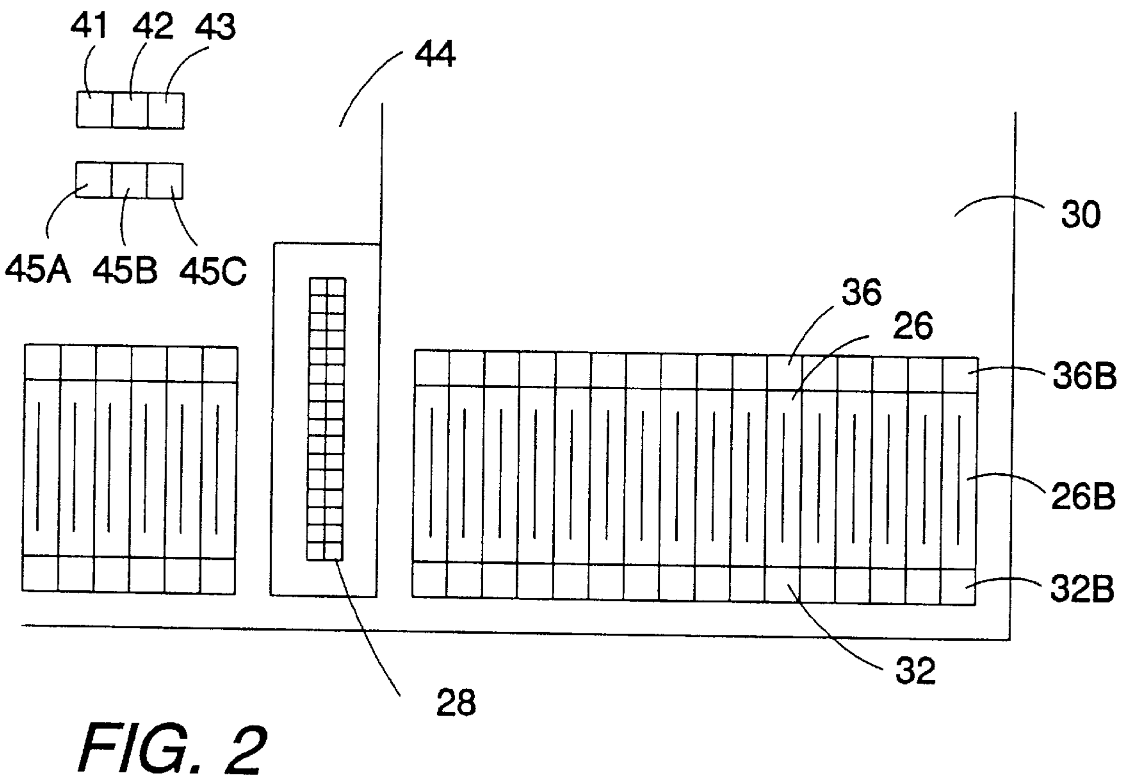
FIG. 2 is a schematic representation in more detail of a part of a control panel of the mixing console of FIG. 1.

FIG. 2 is a schematic representation in more detail of the bottom right hand portion of the panel 12 of FIG. 1.

It will be noted that a solo button 36 is provided above each channel fader of the bank of channel faders 26. Activation of a solo button enables the signal processing channel currently associated with that button and the fader immediately below it to be monitored separately from the other channels. Thus, for example, a particular instrument may be monitored, typically using the studio monitor loudspeakers. As will be described later, various solo modes are provided in the preferred embodiment of the invention. Also shown in FIG. 2 is the bank 32B of access control buttons 32 referred to above for assigning the associated control area 30 to a particular channel to which the particular button in the button bank 32 and the corresponding fader in the fader bank 26 is assigned.

Also illustrated in FIG. 2 are a number of solo mode control buttons and indicators. These include a solo mode button 41 for selecting a solo monitoring mode, an AFL mode button 42 for selecting an AFL monitoring mode via the AFL bus, and a global solo cancel button 43. The global solo cancel button is illuminated when a solo mode or AFL mode has been activated on at least one channel.

Also shown are three buttons 45A, 45B and 45C for selecting one of three solo modes, namely:

45A—a standard solo mode in which each of one or more channels may be independently selected for solo monitoring by a first operation of a respective user operable control, with selection remaining until cancelled either by a second operation of the appropriate user operable control or by operation of a global cancel by a global function cancel control;

45B—an interlock solo mode in which each of one or more channels may be selected for solo monitoring by a first operation of a respective user operable control, with selection remaining until cancelled either by a second operation of the appropriate user operable control or by operation of a global cancel by a global function cancel control or by a first operation of a user operable control for another channel; and 45C—a momentary solo mode in which a channel is selected for solo monitoring only during a period of operation of a user operable control for the channel, the selection being cancelled on termination of user operation of the user operable control.

Figure 3:
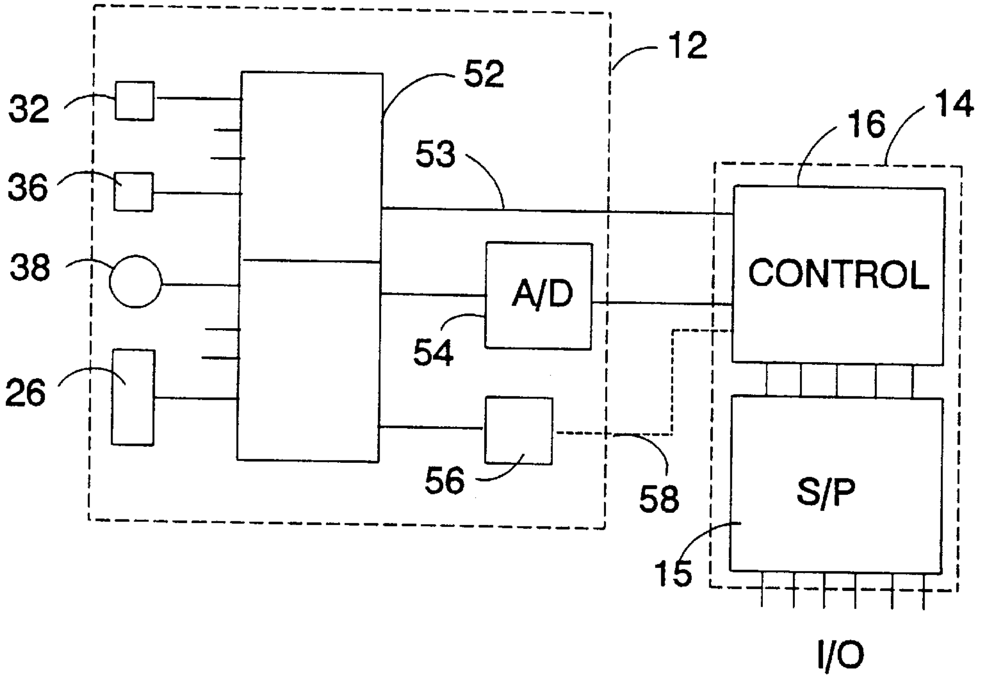
FIG. 3 is a schematic representation of the interconnection of user operable controls on the control panel 12 and the signal processing network of the mixing console of FIG. 1.

FIG. 3 is a schematic representation of the relationship between the user input devices (including the switches 32 and 36—also the plus and minus buttons 64 and 62 and the IN buttons 65 of FIG. 2— and the analogue user devices 26 and 38) on the control panel and the signal processing network 15. Specifically, the control panel 12 comprises a multiplexing arrangement 52 which is responsive to a scan controller 56 to individually sample all of the user operable controls on the control panel in sequence. The values sampled from the user input devices providing binary output signals such as the switches 32, 36, 62, 64 and 65 are passed directly via a line 53 to the processor network 14 as time multiplexed signals. Analogue values sampled from analogue input devices such as control knobs 38 and fader 26 are supplied in a time multiplexed manner via an A/D converter 54 to the processor network 14. Thus, the user operable controls on the control panel 12 are sampled in a manner which will be familiar to one skilled in the art of user input devices such as keyboards, etc. The scanning controller 56 can be included within the control panel 12 as illustrated in FIG. 2, or, alternatively, the scan control can be provided directly from the signal processing network 14 as represented by the dashed line 58.

The time multiplexed signals from the A/D converter 54 are processed in the control processor(s) 16 where the input signals are allocated to separate control and signal processing channels with the necessary signal processing functions being performed on the network 15 of signal processors SP in signal processing channels and with the input and output audio signals being supplied via input and output lines I/O.

In operation, in the present embodiment of the invention, the user selects a particular group of the available channels (e.g, one of 32 groups of sixteen channels from 256 channels in this embodiment), by operation of an appropriate one of the block of keys 28 for a particular sub-panel (e.g. sub-panel 22). Then, by operation of the access control key 32 for a particular channel fader in the bank of faders 26, the user assigns the control knobs and buttons 38 and 39 and the block 60 of the control area 30 to the selected channel. The audio processing stages for the selected channel can then be defined using the input field 61 of the block 60. Subsequently, the control parameters for that audio processing channel can be adjusted and controlled by operation of the user operable control knobs 38, buttons 39, and the channel fader for that channel. At that time, the gain for the other channels in the selected group of channels can be adjusted by the other faders within the bank 26B of faders 26. The group of channels selected can be changed at any time of operation of an appropriate key in the block of keys 28 and the assignment of the control knobs 38 and the buttons 39 in the control area 30 can be changed to any one of channels of the selected group of channels by operation of the appropriate control button in the bank of control buttons 32.

Figure 4:
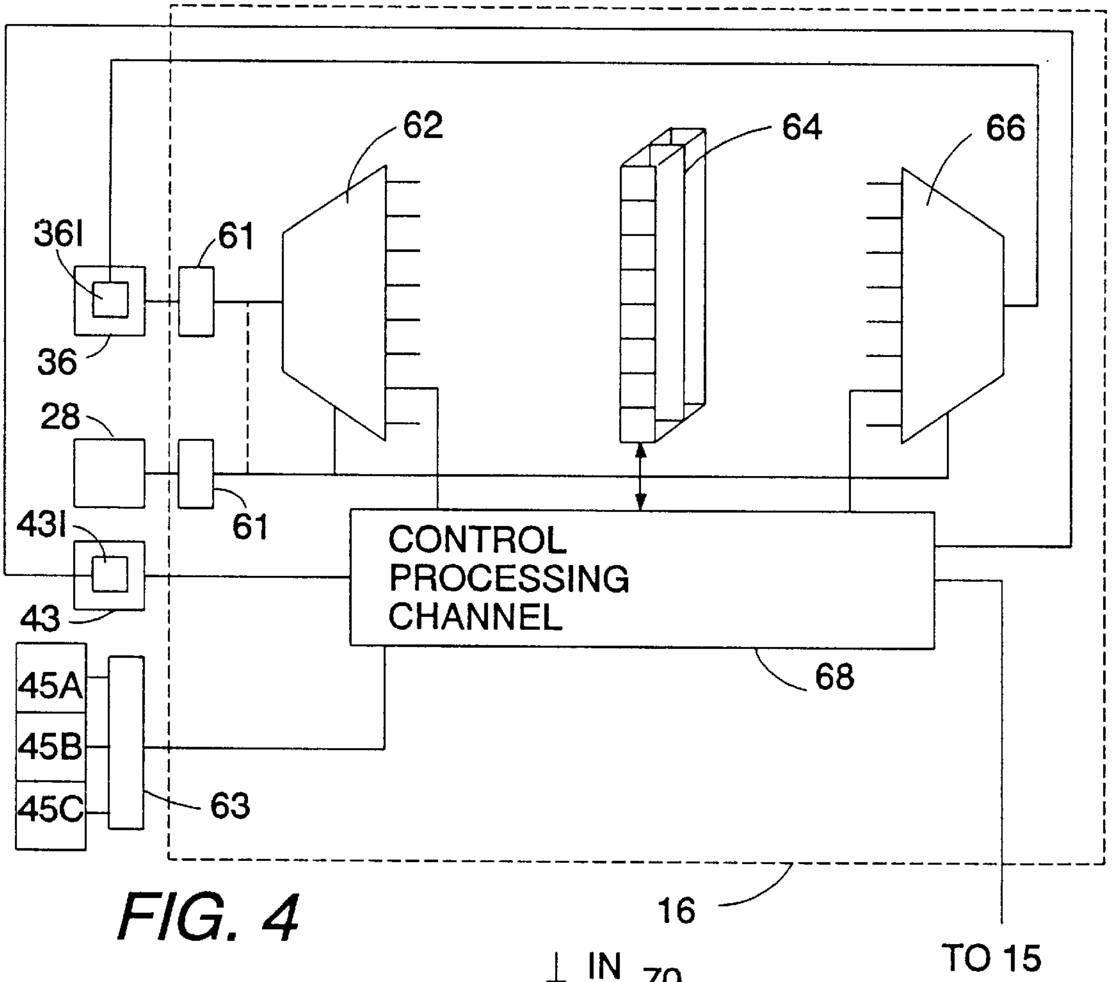
FIG. 4 is a schematic representation of aspects of a processing channel of the mixing console of FIG. 1.

FIG. 4 is a schematic representation of aspects of a control structure for assignable control processing channels implemented in the control processors. In FIG. 4 it will be appreciated that the direct line connections between the control buttons 62, 64, 65 and 28/32 and the control processing structure 67 represent, in the present example, connections via a control structure such as illustrated in FIG. 3 with the control processing structure 67 of FIG. 4 being implemented on the control processor(s) 16 of FIG. 3. In the control processor(s) 16, the signals for the control button 62, 64, 65 and 28/32 are identified from the appropriate time slots in the scanning sequence described with reference to FIG. 3.

FIG. 4 is intended to illustrate the operation performed when operating a solo button 36 for a particular one of the channels currently assigned to one of the sets of faders 26. It will be appreciated that parallel control processing channels exist for the other channels which are currently active.

Thus, the output from the solo button 36, after processing by the switch function 61, is supplied to a demultiplexer/assignment function 62. The demultiplexer/assignment function 62 is responsive to operation of the appropriate one of the control buttons 28 to select a group of control channels for the bank of faders and solo mode buttons, whereby the demultiplexer/assignment function 62 is operative to pass the solo mode switch input to the control processing channel 68 currently assigned to that solo button 36.

Preferably, in accordance with an option which can be selected by means of an option button, operation of a solo button 36 for a channel is effective to cause auto-access to the corresponding channel, whereby it is not necessary separately to activate the access control button 32 in order to allocate the controls on the control area 30 of the panel 12 to the corresponding channel.

An output of the control processing channel 68 is supplied via the multiplexer 66 to a solo mode indicator light 36I for a solo button 36, which light 36I can be incorporated in the solo button 36 itself, to indicate whether a solo mode for the channel currently assigned to that button has been selected. A further output from the control processing channel is supplied to activate the global solo mode cancel indicator light 43I when a solo mode has been activated for at least one channel, whether or not the channel is currently assigned to the bank of faders and solo buttons 26/36.

In order to record the channels for which a solo mode is currently active, groups of one bit registers 64 are provided, each group of one bit registers being associated with a respective group of selectable channels. A logical one bit can be stored in the appropriate register when a solo mode is selected for the channel concerned and a logical zero bit stored otherwise. Thus, the solo mode status for each group of, for example, 16, 24, or 32 channels can be stored in one sixteen bit word, the solo mode status for all 256 channels in the preferred embodiment being stored in thirty-two sixteen bit control words. Thus, the registers 64 are preferably implemented in predetermined control words stored at predetermined memory addresses in the control processor memory.

To determine whether a solo mode has been activated in any particular channel it is merely necessary to determine whether the appropriate bit for that channel is logical one. To determine whether a solo mode has been set for at least one channel the control processor channel merely needs to determined whether any of the control words is non-zero.

The global solo mode cancel button 43 is connected to all the control channels including the control channel 68. In fact the switch for the global solo mode cancer button 43 is connected such that, when the global solo mode cancel button 43 is operated, all control channels reset all of the control words 64 whereby any previously selected solo mode for any channel, whether for a channel currently assigned to the bank of solo buttons 36B, or not, is cancelled.

The solo mode buttons 45A, 45A and 45C are connected to the control channel 68 for selecting the solo mode type. The three buttons 45*a,* 45B and 45C are interlocked via a global interlock switch function 63 to each of the channels such that the solo mode will be selected in common for all channels.

Control and coefficient signal outputs from the control channel implemented on the control processor(s) 16 are passed to the corresponding signal channel implemented on the signal processing array 15.

Figure 5:
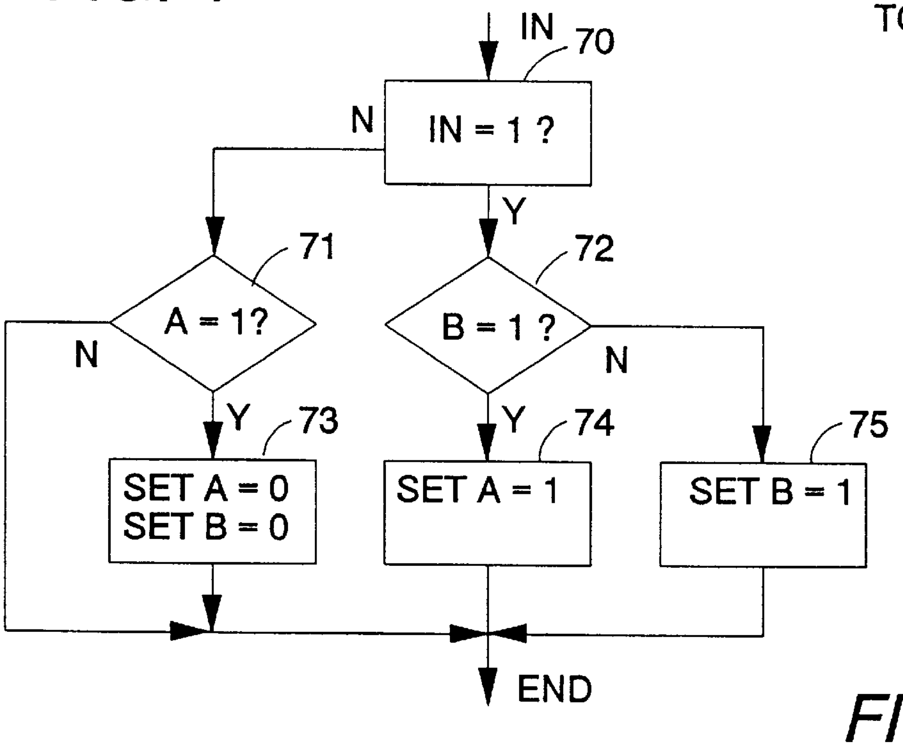
FIG. 5 is a flow diagram illustrating the logic control for switch functions of the mixing console of FIG. 1.

FIG. 5 is a flow diagram illustrating the switch latch function 61 illustrated in FIG. 4. This switch function simulates the latch type switch function of a mechanical switch without the need to actually provide manual switches. Thus, simple logic type switches may be employed on the panel 12, the logic switches being closed when an associated control button is depressed and being open when the associated control button is raised.

In contrast, thereto, with a conventional mechanical latched switch, the switch contacts are closed on depression of the switch in a first actuation, and are subsequently open following release of the button on a subsequent actuation thereof.

The switch latch function includes a register A for internal use and a register B which contains an output value (on or off represented as 1 or 0). The input from the switch is also indicated by a 1 or 0 representing pressed or released.

At system initialisation time both registers A and B are cleared to 0. When the input switch is operated, the switch latch function tests whether the input is 1 (step 70).

If the input is 1, the switch latch function then tests (step 72) whether the value in register B (the output) is 1. If this is true, then the value of A is set 1 (step 74) and no other action is taken, that is the output value remains at 1. If the input is 1 and the value in B (the output) is 0, then the value in B is set to 1 (step 75), that is the output changes from “off” to “on”.

If the input is 0, the switch latch function tests whether the value in A is 1 (step 71). If the value in A is 1, then the values in A and B are set to 0 (step 73), that is the output changes from “on” to “off”.

Accordingly, therefore, the switch function is operable in a latch mode of the switches to monitor the actual switch contact status.

Figure 6:
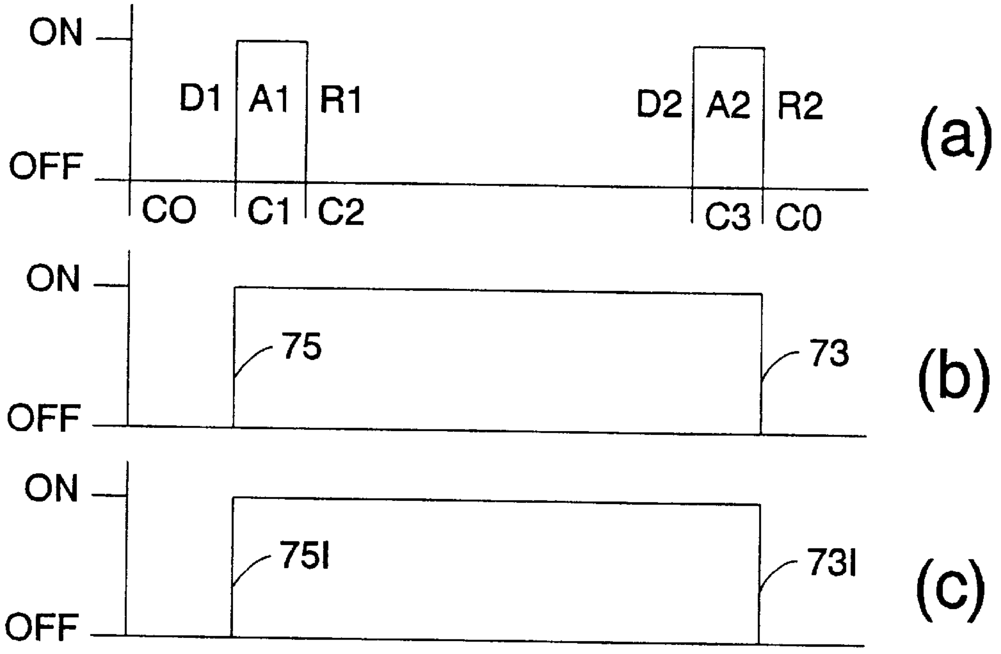
FIG. 6 is a timing diagram for explaining the logic control of FIG. 5.

FIG. 6 forms a set of timing diagrams FIG. 6*a,* FIG. 6*b* and FIG. 6*c* illustrating the switching states resulting from the process described with reference to FIG. 5. Thus, A1 represents the first actuation of a control button with D1 representing the depression of that button and R1 relating to the release of that button during the first actuation thereof. A2 represents the second actuation of that button with D2 representing the depression of that button and R2 representing the release of that button during the second actuation thereof. 75 represents the change in the function value from off to on at step 75 in FIG. 5 and 73 represents the corresponding function transition at step 73 in FIG. 5. In FIG. 6*c,* the references 75I and 73I represent the transitions for the illumination and extinguishing, respectively, of a light associated with, preferably contained within, the button concerned on actuation and release of the control function relating to that button.

Figure 7:
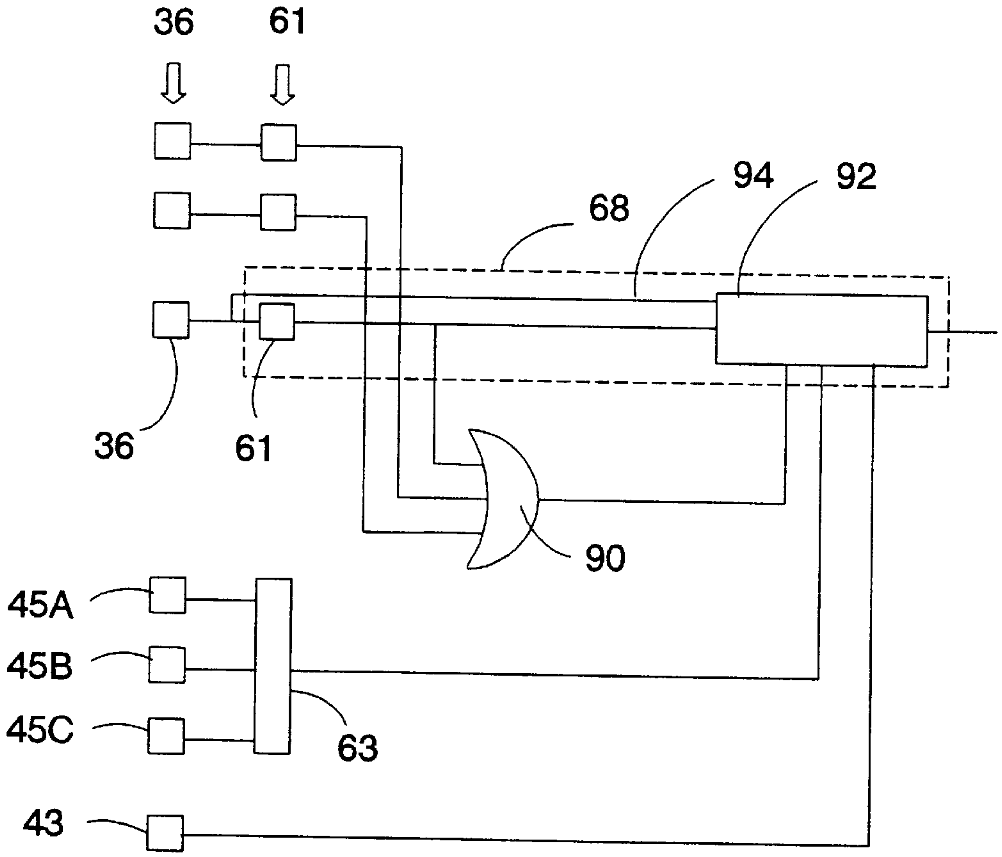
FIG. 7 is a schematic diagram illustrating an implementation of the solo mode functions.

FIG. 7 is a schematic diagram illustrating the implementation of solo operating modes.

The global solo mode cancel button 43 is connected to a solo mode controller 92 for each channel 68. If the global solo mode button is activated, then this causes the content of all the control words 64 for the respective channels to be reset to zero cancelling all solo modes previously set.

The three switches 45A, 45B and 45C are connected via the interlock switch function to the solo mode controller 92 for each channel 68 in order to provide a signal to the solo mode controller 92 representative of a currently selected solo mode.

The output of the switch function 61 for the solo button 36 for the channel shown in FIG. 7 is connected to the solo mode controller 92 in the channel.

The output of the switch function 61 for the solo buttons 36 for each the channels is connected to a respective input of an OR function 90. The output of the OR function 90 is connected in common to the solo mode controllers 92 of each channel 68.

The solo mode function has three modes of operation.

In a first mode, which is selected by operation of the button 45A, each of one or more channels may be selected for solo monitoring by a first operation of a solo button for the or each channel concerned, with selection remaining until cancelled either by a second operation of the solo button for the respective channel or by operation of a global cancel by a global function cancel control.

In this first mode, on operating a solo button for a channel, the solo mode controller 92 tests whether a logical one is stored in the appropriate bit position within the appropriate control word 64 for that channel. If it is determined that a logical one is stored for that control channel, it is concluded that the solo mode is currently on and therefore a logical zero is written to that bit position in the control word 64 to turn the solo mode off with the result that the solo mode is cancelled and the illumination 36I for the solo button 36 is turned off. If, alternatively, it is determined a logical zero is stored at the appropriate bit position in the appropriate control word 64, a logical one is stored at that position in the control word 64 to turn the solo mode on, whereby the solo mode function is activated and the illumination 36I for the appropriate solo button 36 is turned on. If the global solo mode indicator 41 is not already illuminated, this is also illuminated by the control channel 68. Likewise, if the illumination in the global solo cancel button 43 is not already illuminated, this is then illuminated. Operation of the global solo mode cancel button 43 in this mode causes the cancellation of all currently active solo modes.

In a second, interlocked, mode, which is selected by operation of the button 45B, a channel may be selected for solo monitoring by a first operation of a solo button 36 for the channel concerned, with selection remaining until cancelled either by a second operation of the solo button for the respective channel or by operation of a global cancel by a global function cancel control or by a first operation of a solo button for another channel.

In this second mode, on activation of a solo button 36 for a particular channel, all previously selected solo modes are cancelled by resetting all the control words 64 to zero. If a channel has previously been set, this will be detected at the output of the OR gate 90, which output will be high. This also causes the cancelling of the illumination of any solo modes. Then, almost immediately, a logical one is written to the appropriate bit position in the appropriate control word for the channel concerned to activate the solo mode for that channel and the illumination 36I for the solo mode switch 36 for that channel is turned on. If the global solo mode indicator 41 and the global solo mode cancel button 43 are not already illuminated, then these are also illuminated by the control channel 68. In this mode, operation of the global solo mode cancel button 43 will cause the cancellation of the, if any, currently active solo mode.

In a third mode, which is selected by operation of the button 45C, a channel is selected for solo monitoring only during a period of operation of a user operable control for said channel, said selection being cancelled on termination of user operation of said user operable control.

In this third mode, the solo mode is only activated for a channel during depression of the solo button for that channel. Accordingly, during the momentary solo mode, the switch function 61 for the solo buttons are bypassed (path 94) whereby the physical closure or opening of the switches associated with the solo buttons determines whether the solo mode is active or not, a logical one thus only being temporarily written into the appropriate bit in the appropriate control word 64 during depression of that button.

A user operable control is provided to select the signal source for the control room loudspeakers. In a conventional console, if an after-fade listen (AFL) or pre-fade listen (PFL) function is activated, the result will be heard on the control room loudspeakers. Operation of the loudspeaker source selector function connects the loudspeakers permanently to the main stereo output bus only, allowing the operator to monitor AFL and PFL functions privately using headphones, while the complete mix is audible on the loudspeakers.

Figure 8:
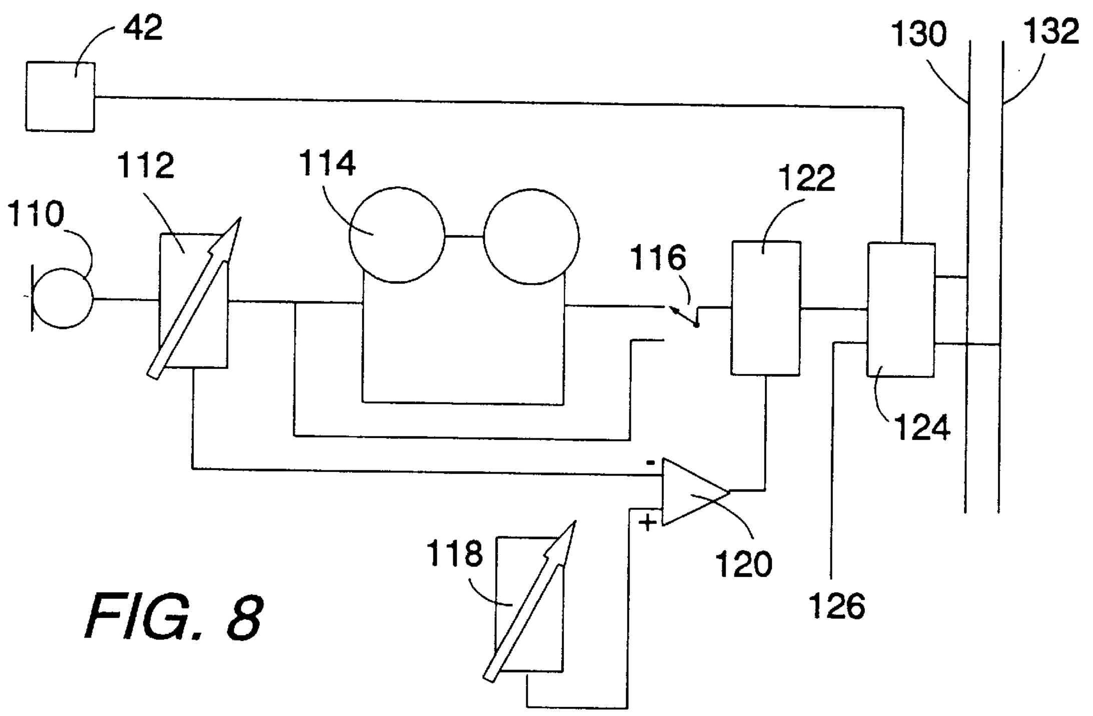
FIG. 8 is a schematic diagram illustrating aspects of a signal processing channel of the mixing console of FIG. 1.

FIG. 8 is a schematic diagram illustrating aspects of a signal processing channel implemented on an audio mixing console in accordance with the present invention.

In FIG. 8 a microphone 110 is connected via a recording level control 112 to a recording channel 114 (for example one recording channel on a multi-track tape recorder). The output of the recording channel 114 or the output of the recording level control 112 can be selected by means of a switch 116 to be passed via a monitor level control 122 to an output selector 124 for passing to either a main bus 130 or an AFL bus 132. The monitor level control 118 is connected to the monitor level control 122 via a logical circuit 120 which compensates for adjustments made to the recording level control 112.

During recording, it is desirable to ensure that the maximum possible signal level is recorded in the recording channel 114 in order to optimise the signal to noise ratio and hence to reduce the noise level on subsequent replay of the recording. If dynamic changes are made to the recording level control 112, this will have an effect on the output value passed either via the recording channel 114 or directly to the switch 116. Accordingly, in order to avoid the need for consequent changing of the position of the monitor level control 118 manually to compensate for changes in the position of the recording level control 112, a fader position value, typically in dBs, from the monitor level control 118 is passed to the positive input of a subtracter 120, a fader position value 112, typically in dBs, from the recording level control 112 being passed to the negative input of the subtracter 120. Thus, any change in position of the recording level control 112 is cancelled out in the monitor level controller 122.

It will be appreciated that the structure shown on FIG. 8 is implemented digitally within control and signal processing channels on the control and data processing network 14. Thus, for example, the input values for the controls 112 and 118 are provided by implementing control channels on the control processors 16 to maintain and adjust the fader position values in a manner generally similar to the operation of the solo buttons in FIG. 4, except that in the case of the fader control, the input devices are faders rather than solo mode switches and the control processor implements the subtracter 120. The output from the recording level control 112 is passed directly as coefficient data to an appropriate position in the signal processing path as implemented on the signal processing network for implementing the recording level control 112 and the output of the subtracter 120 is passed as coefficient data to the signal processing network for implementing the compensated monitor level control 118 as represented by the fader control function 122. Although a very simple signal processing path has been illustrated in FIG. 8, it will be appreciated that signal processing channels can include many stages and many different signal processing operations.

In complex signal processing operations, it is sometimes desirable to pre-program switch operations. It may be desirable to pre-program the operation of a mute switch in order to selectively cancel for a particular time during a mixing operation. For example, on a channel representing a percussion sequence, a drummer may accidentally have recorded an additional drum beat where the drum beat was not required. By the use of a mute button, it is possible to cancel that drumbeat. This will normally be done by subsequent passes of recorded material with the application of the mute during the appropriate time. However, exactly identifying the on and off times for the mute switch is a difficult task. On a first pass, it may be possible to correctly identify the start of the mute operation, but is may not be possible to correctly identify the end of the mute operation. Traditionally, in order to correct mute transitions, it has been necessary to repeat the pass and re-record the mute operations. However, on a subsequent try, it may be that although the release of the mute operation was timed correctly, the initial operation was timed incorrectly.

Figure 9:
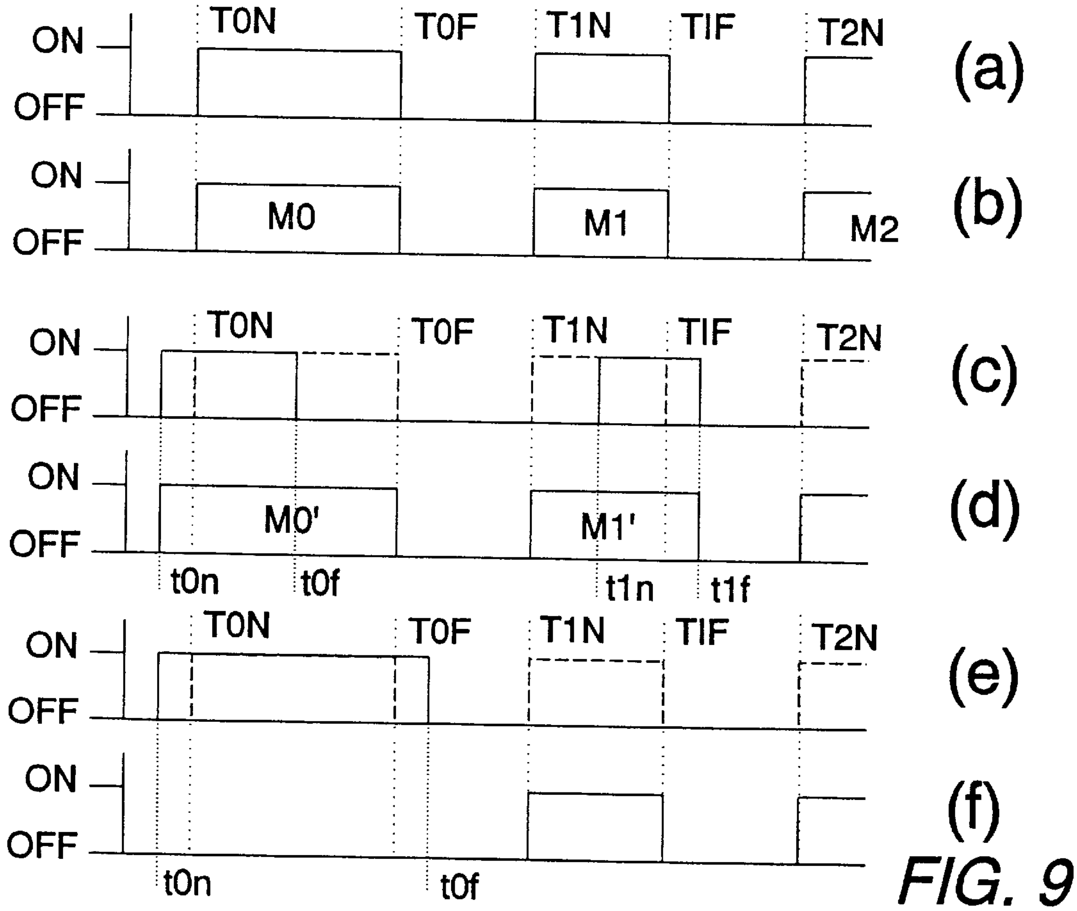
FIG. 9 is a set of timing diagrams for explaining aspects of an automatic switching mode of the console of FIG. 1.

Accordingly, in accordance with one aspect of the present invention, the control processor can be programed to adjust either the start of a mute operation by moving the start forwards or end of a mute operation by moving the end backwards. The logic for implementing this function is illustrated in the flow diagram of FIG. 10 with FIG. 9 illustrating the various actions as performed in the flow diagram of FIG. 10.

FIG. 9*a* illustrates a possible first pass for mixing together two signals where a first signal is interrupted, or muted, during periods in which the switch position is shown ON. Thus, as shown in FIG. 9*a,* during a first pass the mute operation is turned on for a period between T0N and T0F then turned on again between a period T1N and T1F and then turned on for a third time at T2N. Accordingly, in a subsequent pass, as illustrated in FIG. 9*b,* the actions of the first pass are repeated as illustrated. Let us assume that the timing of the end of the first activation of T0F and the beginning of the activation at T1N are incorrect.

FIGS. 9*c* and 9*d* illustrate correction signals input and the resulting signals, respectively, for advancing the T0N transition and delaying the T1F transition to provide T0N' and T1F', respectively.

In order to advance the leading flank T0N of a first mute operation M0 represented in FIG. 9*a* to give a resulting first mute operation M0' represented in FIG. 9*d,* the mute switch is turned on at t0n before the previous T0N transition of the first mute operation and is turned off at tof between the previous T0N and T0F transitions of the first mute operation M0. The control logic of the automatic switch controller is thus arranged to advance the leading flank of the recorded mute switch operation to generate a new leading flank of the resulting first mute operation M0' at a timing corresponding to t0n.

In order to delay the trailing flank T1F of a second mute operation M1 represented in FIG. 9*a* to give a resulting first mute operation M1' represented in FIG. 9*d*, the mute switch is turned on at t1n between the previous T1N and T1F transitions of the second mute operation M1 and is turned off at t1f after the previous T1F transition of the second mute operation. The control logic of the automatic switch controller is thus arranged to delay the trailing flank of the second recorded mute switch operation to generate a new trailing flank for the resulting second mute operation M1' at a timing corresponding to t1f.

FIG. 9*e* illustrates correction signals input for erasing a selected mute signal. In order to erase the first mute operation M0 represented in FIG. 9*a* to give the resulting erasure of the first mute operation as represented in FIG. 9*f*, the mute control button is turned on at t0n before the leading flank T0N of the previous first mute operation M0, and is turned off at t0f after the trailing flank T0F of the previous first mute operation M0. Thus, the control logic of the automatic switch controller is arranged to respond to this sequence of operations to retard erase a previously recorded mute switch operation.

Figure 10:
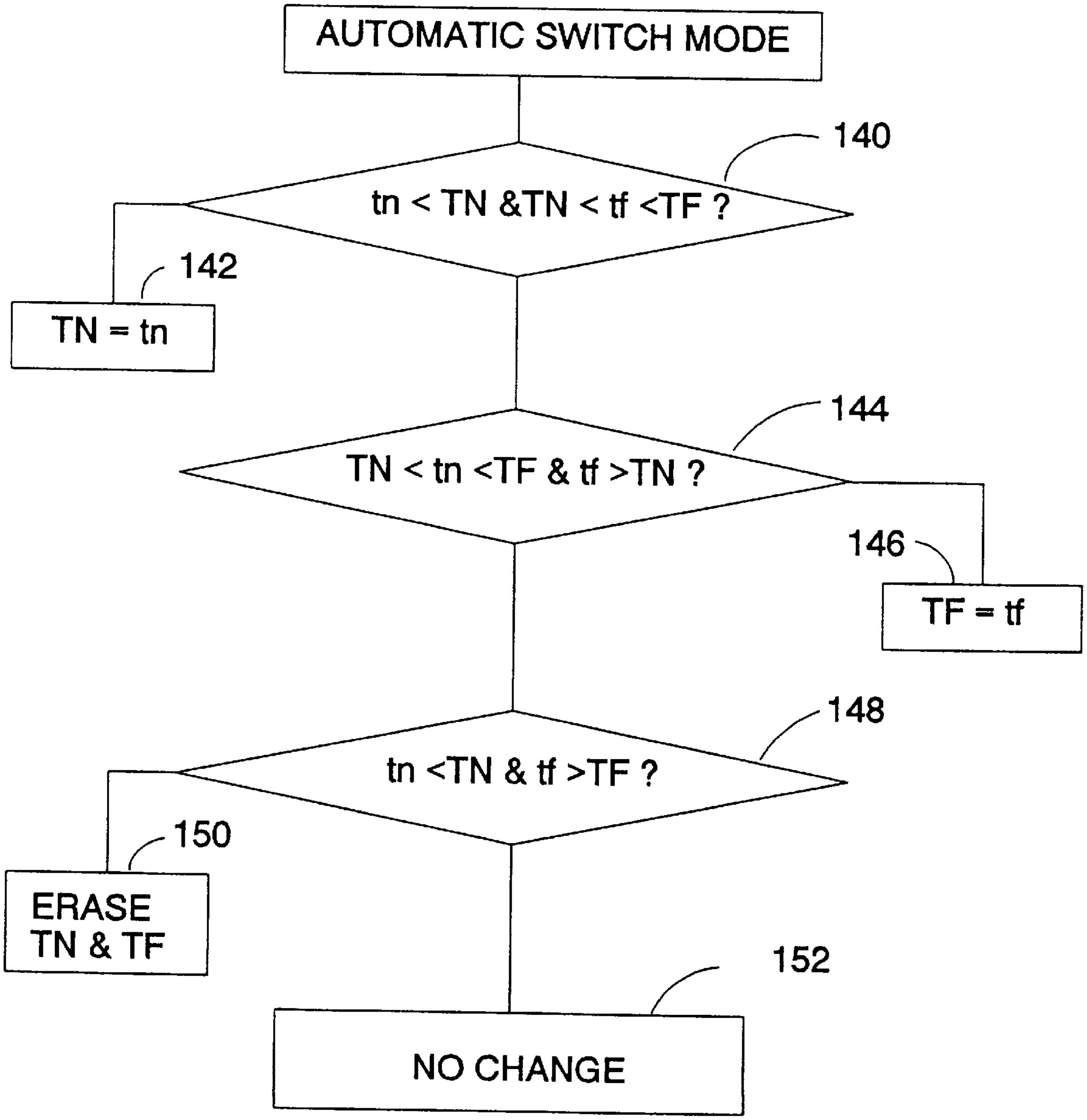
FIG. 10 is a flow diagram illustrating the automatic switching mode of the console of FIG. 1.

FIG. 10 illustrates the control logic of the automation mode controller of the control channel 68 of FIG. 4 for automated switch control timings. Thus, in step 140, if tn is less than TN and tf is greater than TN but less than TF, then in step 142 TN is advanced to tn as represented in the first mute operation of FIGS. 9*c* and 9*d*. If, in step 144, tn is greater than TN but less than TF and tf is greater than TF then, in step 146, TF is set equal to tf as represented in the second mute operation in FIGS. 9*c* and 9*d*.

If, in step 148, tn is less than TN and tf is greater than TF, then in step 150, TN and TF are erased altogether, cancelling the mute operation concerned are is represented for the first mute operation in FIGS. 9*e* and 9*f*.

For all other conditions, as represented in step 152, no action is performed.

There have been described various aspects of an audio mixing console with user controls which can be dynamically allocated to respective processing channels. In particular, aspects of solo mode and control button operations of an audio mixing console have been described. Embodiment of the present invention enable the provision of a compact audio mixing console with full functionality, but with only a relatively small number of user operable controls, and while still maintaining logical and easy user operation.

Although particular embodiments of the invention have been described in the present application, it will be appreciated that many modifications and/or additions may be made to the particular embodiments within the spirit and scope of the present invention.

For example, although in FIG. 1 a control panel is shown which comprises two sub-panels and a central control area, it will be appreciated that a different number of sub-panels could be provided in an alternative embodiment of the invention. Also, a different number of faders could be provided within each sub-panel. Moreover, it will be appreciated that a different arrangement of the various control areas within the control panel could be provided in alternative embodiments of the invention.

Also, although certain switch control operations such as the automation mode have been described with respect to certain switch functions such as the mute control, it will be appreciated that other combinations of switch functions and operations can be envisaged within the scope of the invention.

If desired, rather than a simple substraction function for subtracting the recording level control value from the monitor level control as shown in FIG. 8, a more complex function could be employed in order to take account of particular fader characteristics (e.g., non-linear characteristics). Also, although in FIG. 8, reference has been made to a recording fader and a monitoring fader, the principles applied in FIG. 8 can be applied to any signal processing channels where two, faders or other variable control functions are incorporated in series in a signal processing channel.

We claim:

1. An audio mixing console for performing a plurality of audio processing functions in a plurality of audio channels, said audio mixing console comprising:

- a control panel including a plurality of user operable channel controls, wherein each of said user operable channel controls is operable to select a predetermined audio processing function for a respective audio channel, at least one of the user operable channel controls having an on state and an off state;
- means for assigning a group of audio channels selected from said plurality of audio channels to said user operable channel controls;
- a function indicator shared by said plurality of audio channels for indicating that said predetermined audio processing function has been selected for at least one audio channel; and
- an automation mode controller for storing, in a first pass, on-going transitions at which said at least one user operable channel control is switched from said off state to said on state and for storing off-going transitions at which said at least one user operable channel control is switched from said on state to said off state, said automation mode controller automatically reproducing said selectively changing the on-going or off-going transitions in said second pass.

2. The apparatus according to claim 1, wherein said one audio channel is not in said group of channels.

3. The apparatus according to claim 1, further comprising a user operable function cancel control shared by said plurality of audio channels for canceling said predetermined audio processing function in all of said audio channels.

4. The apparatus according to claim 3, wherein said function indicator corresponds to said user operable function cancel control.

5. The apparatus according to claim 3, wherein said predetermined audio processing function is a solo channel monitoring function for monitoring said one audio channel.

6. The apparatus according to claim 5, wherein said solo channel monitoring function includes at least first, second and third modes, wherein in said first mode at least one audio channel is selectable by a first operation of a respective user operable channel control for solo monitoring said one audio channel that continues until selectively canceled either by a second operation of said respective user operable channel control or by said user operable function cancel control, wherein in said second mode at least one audio channel is selectable by said first operation of said respective user operable channel control for solo monitoring said one audio channel that continues until selectively canceled either by said second operation of said respective user operable channel control or by said user operable function cancel control or by said first operation performed on another audio channel, and wherein in said third mode at least one audio channel is selectable by a third operation of said respective user operable channel control for solo monitoring said one audio channel that is canceled by terminating said third operation.

7. The apparatus according to claim 1, wherein said user operable channel controls are buttons.

8. The apparatus according to claim 7, wherein each of said buttons corresponds to a respective channel function indicator for indicating that said predetermined audio processing function has been selected for said respective audio channel.

9. The apparatus according to claim 1, further comprising a plurality of channel faders, wherein each of said user operable channel controls corresponds to a respective channel fader.

10. The apparatus according to claim 1, further comprising control room loudspeaker, wherein a user operable channel control in said plurality of user operable channel controls selects a signal source for said control room loudspeaker.

11. The apparatus according to claim 1, further comprising an indicator which is illuminated when said predetermined audio processing function has been selected.

12. The apparatus according to claim 1, wherein said user operable channel controls includes a logic button comprising:

a button member movable between a raised position and a depressed position;

a switch contact which is open in said raised position and is closed in said depressed position; and logical latch means responsive to a first closing of said switch contact on a first depression to change from an inactive logical state to an active logical state, said logical latch means maintaining said active logical state on a first opening of said switch contact on a first release followed by a second closing of said switch contact on a second depression, said logical latch means being responsive to a second opening of said switch contact on a second release to change from said active logical state to said inactive logical state.

13. The apparatus according to claim 12, further comprising an indicator which is illuminated in said active logical state and is not illuminated in said inactive logical state.

14. The apparatus according to claim 1, wherein the automation mode controller is operable to advance the stored on-going transitions.

15. The apparatus according to claim 1, wherein the automation mode controller is operable to delay the stored off-going transitions.

16. The apparatus according to claim 1, wherein the automation mode controller is operable to delete the stored on-going and off-going transitions.

* * * * *